United States Patent [19]
Parks

[11] Patent Number: 5,306,045
[45] Date of Patent: Apr. 26, 1994

[54] SHOULDER HARNESS SLEEVE

[76] Inventor: Jeffery S. Parks, 21727 Harper Lake, St. Clair Shores, Mich. 48080

[21] Appl. No.: 64,319

[22] Filed: May 20, 1993

[51] Int. Cl.$^5$ .............................................. B60R 22/10
[52] U.S. Cl. .................... 280/808; 280/801.1; 297/468; 297/482; 297/486
[58] Field of Search ................ 280/808, 801 R; 297/468, 483, 486, 482

[56] References Cited

U.S. PATENT DOCUMENTS

| D. 304,779 | 11/1989 | Raphael et al. | 297/482 |
|---|---|---|---|
| 4,796,919 | 1/1989 | Linden | 280/808 |
| 4,887,318 | 12/1989 | Weinreb | 297/482 |
| 4,969,663 | 11/1990 | Nowacki | 280/801 R |
| 5,215,333 | 6/1993 | Knight | 280/801 R |
| 5,255,940 | 10/1993 | Kornblum et al. | 280/808 |

FOREIGN PATENT DOCUMENTS 656565  5/1929  France.
8100607 3/1981  World Int. Prop. O..

*Primary Examiner*—Eric Culbreth
*Attorney, Agent, or Firm*—Peter A. Taucher; David L. Kuhn

[57] ABSTRACT

Disclosed is a sleeve for modify a seat belt assembly, the sleeve being used to vary the position of the shoulder strap or other portion of the assembly relative to the passenger. The sleeve is installed at a portion of the seat belt assembly where a belt or strap forms a loop through an eye mounted at an anchor point of the assembly, and the sleeve holds opposed sections of the loop in facial contact. The sleeve has flaps that fold and attach together so as to releasably secure the sleeve around the loop sections. The sleeve also has a tongue extending therefrom through the eye and into attachment to one of the flaps, whereby movement of the sleeve relative to the seat belt assembly is limited or prevented.

14 Claims, 4 Drawing Sheets

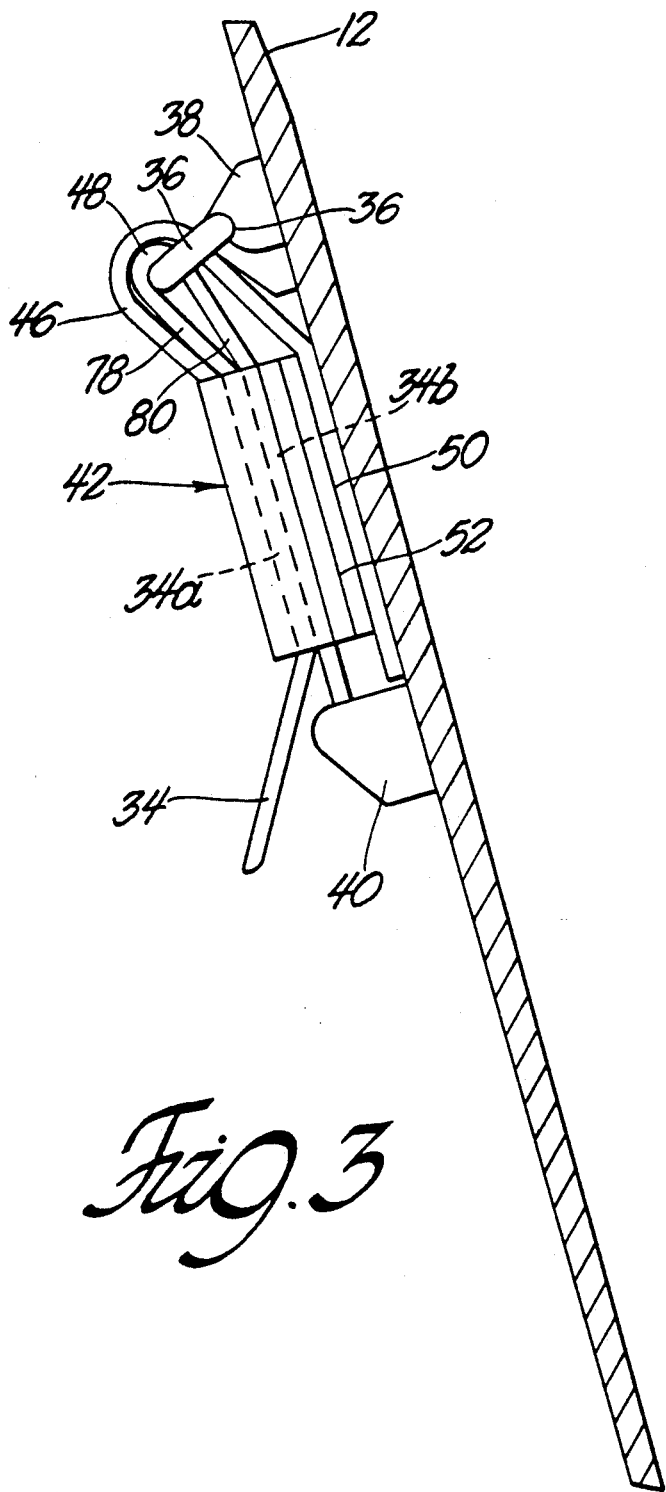
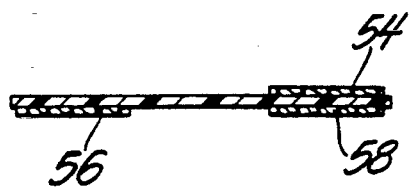

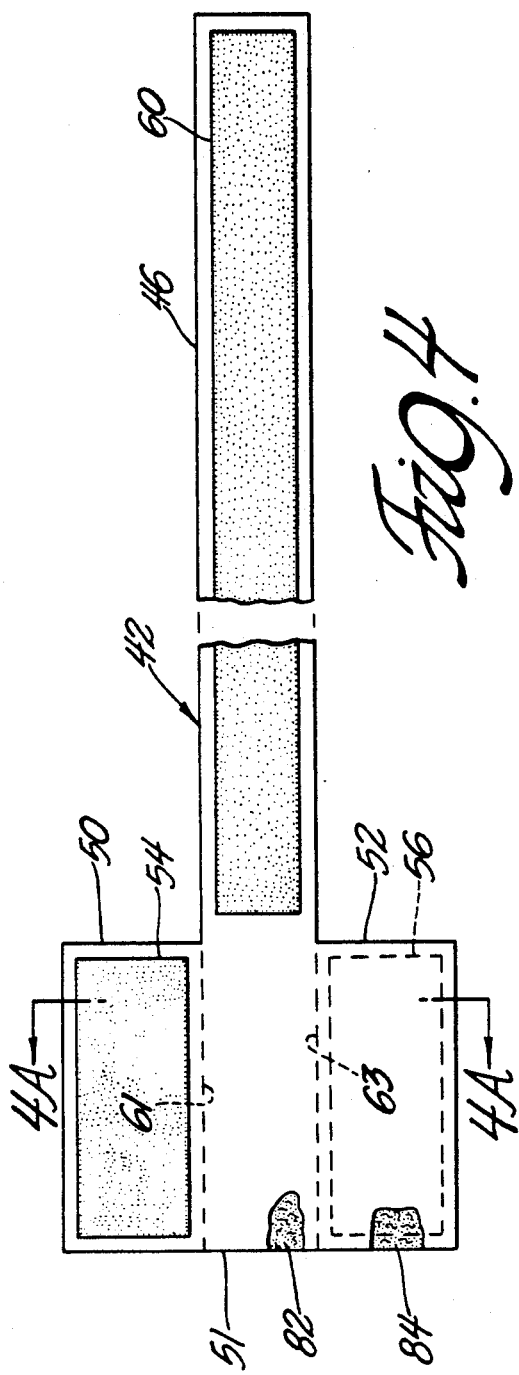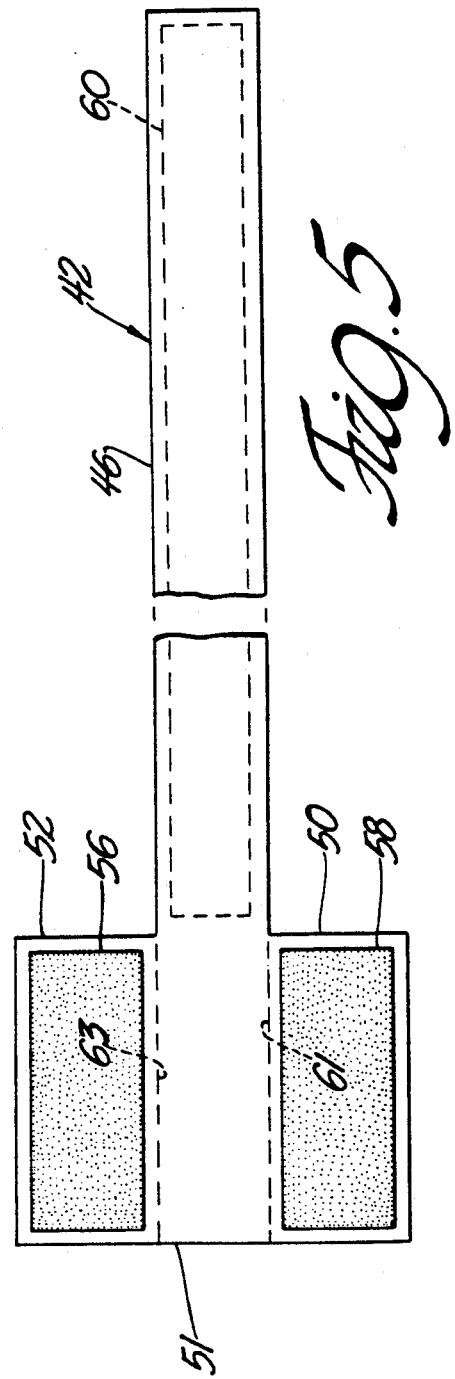

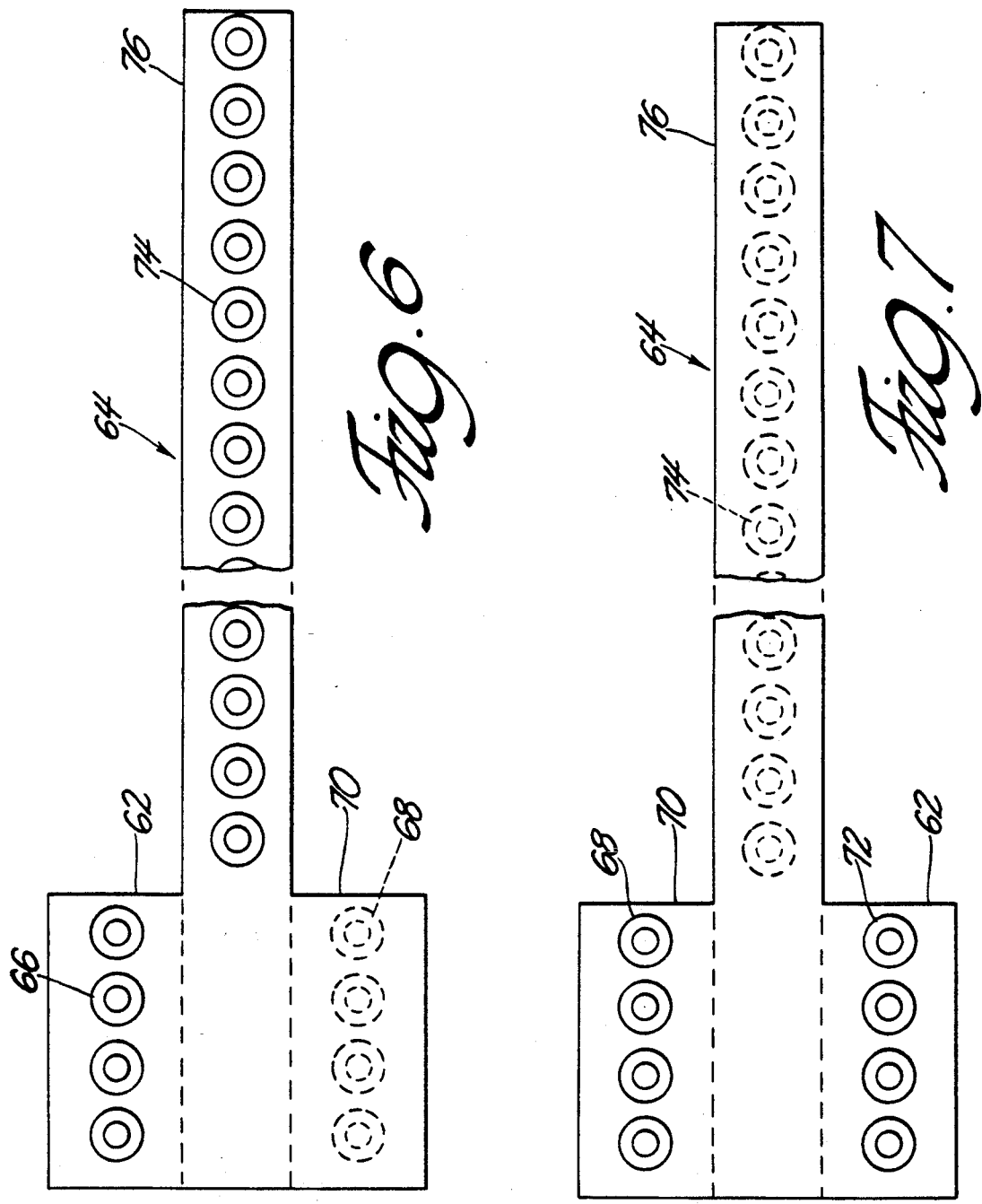

SHOULDER HARNESS SLEEVE

GOVERNMENT USE

The invention described herein may be manufactured, used and licensed by or for the U.S. Government for governmental purposes without payment to me of any royalty thereon.

BACKGROUND AND SUMMARY

Most seat belt assemblies of automotive vehicles have a shoulder strap intended to pass diagonally over a passenger's shoulder toward the passenger's waist. For small adults or for children, the shoulder strap passes over the neck or head, making the strap uncomfortable and unduly restrictive of passenger movement. Further, the shoulder strap can injure a smaller passenger if that passenger is jolted forward against the strap.

My invention solves the above problem by a sleeve that adjusts the strap to pass correctly over the smaller passenger's shoulder. The sleeve engage a portion of the strap that forms a loop through an eye anchored in the vehicle, and the sleeve holds together opposed sections of the loop. The sleeve has a pair of flaps that releasably secure the sleeve around the opposed loop sections. A tongue extending from the sleeve passes through the eye and attaches to one of the flaps so as to limit the sleeve's movement along the strap.

BRIEF DESCRIPTION OF THE DRAWINGS

FIG. 3 is a detail view of the sleeve and surrounding components of the seat belt assembly.

FIG. 4 is a view of one side of the sleeve in its unfolded configuration.

FIG. 4A is a view taken along line 4A—4A in FIG. 4.

FIG. 5 shows the reverse side of the sleeve in its unfolded configuration.

FIG. 6 is a view of one side of a modified sleeve in the unfolded configuration.

FIG. 7 is shows the reverse side of the FIG. 6 sleeve.

DETAILED DESCRIPTION

Figure 1:
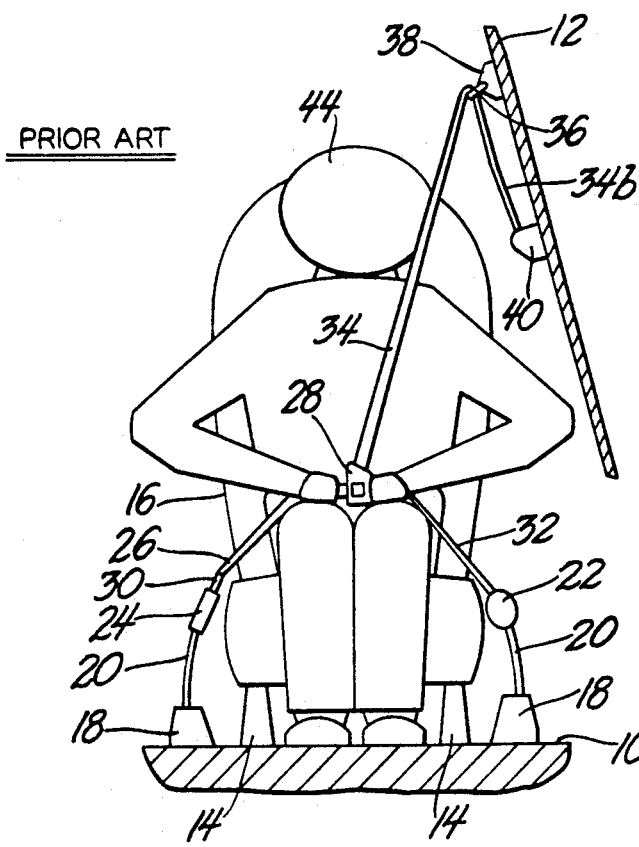
FIG. 1 shows a relatively small person harnessed in a conventional seat belt assembly.

FIG. 1 shows a conventional seat belt assembly mounted to structural members such as base 10 and post 12 of a vehicle body (not shown). Fixed to base 10 are seat belt anchors 18 and supports 14, which connect passenger seat 16 to the base. Flexible bands 20 connect belt retractor 22 and latch 24 to anchors 18. Belt segment 26 is connected between junction element 28 and a keeper 30 that is received by latch 24, while belt segment 32 connects between element 28 and retractor 22. Belt segment 34 extends from element 28 and passes through anchor eye 36, which swivels on anchor bracket 38 affixed to post 12 of the vehicle body. One end of segment 34 engages another belt retractor 40 typically mounted to post 12.

Figure 2:
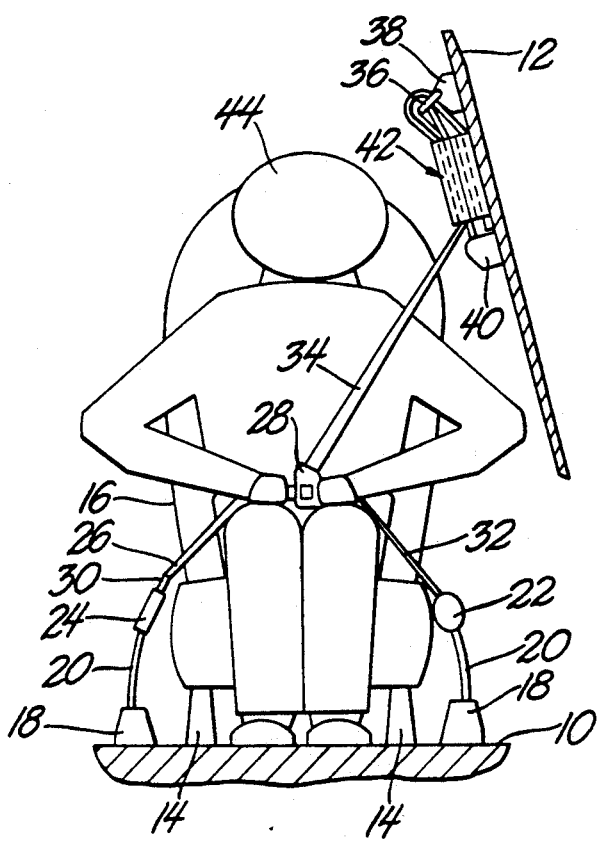
FIG. 2 shows the relatively small person in the seat belt assembly as modified by my sleeve.

FIG. 2 is the same as FIG. 1 except that shoulder belt sleeve 42 is on belt segment 34, so that segment 34 no longer passes along the neck or head of passenger 44. Details of sleeve 42 are shown in FIG. 3 wherein sleeve 42 encloses and holds together two sections 34a and 34b of belt segment 34. Sleeve 42 can be made of any suitable material such as leather, naugahyde, cordura nylon or the same fabric as the seat belts. Elongate tongue 46 of the sleeve wraps around bight 48 of segment 34 and then passes between outer flap 50 and post 12. The portion of tongue 46 between the outer flap and the post is preferably sandwiched closely between these latter two elements. An inner sleeve flap 52 is disposed between flap 50 and section 34b.

Laid out, or unfolded, views of sleeve 42 are shown in FIGS. 4 and 5. FIG. 4 shows the inner, belt facing side of the unfolded sleeve and FIG. 5 shows the opposite, outer side of the sleeve. Referring to FIG. 4, outer flap 50 has a rectangular VELCRO ™ panel 54 covering most of this flap's inner surface, which faces toward section 34b in FIG. 3. A complementary VELCRO ™ panel 56 covers most of the outer surface of inner flap 52 and panel 56 will engage panel 54 when sleeve 42 is in the FIG. 3 configuration. Flap 52 has a second velcro panel 58 covering most of its outer surface, panel 58 facing tongue 46 in the FIG. 3 configuration of the sleeve. An elongate velcro panel 60 is on the inner, belt facing side of tongue 46, panel 60 engaging panel 56 when sleeve 42 is in the FIG. 3 configuration. Numerous designs for velcro panels will be suitable for sleeve 42. One acceptable variant of a velcro panel for my sleeve is one having an engagement area of 2" by 2" and conforming to Military Specification MIL-F-21840G of Dec. 16, 1987.

Note that dashed lines 61 and 63 in FIGS. 4 and 5 represent fold lines for respective flaps 50 and 52 when these flaps fold over belt sections 34a and 34b. These lines border an inter-flap zone 51 that merges with tongue 46.

FIGS. 6 and 7 show a slightly modified embodiment 64 of the sleeve wherein snap elements replace the velcro panels as the means to fasten the tongue and flaps of the sleeve together. In FIG. 6, outer flap 62 has a set of snap elements 66 on its inner surface while a complimentary set of snaps 68 is on the outer surface of inner flap 70, and elements 66 will engage complimentary elements 68 when sleeve 64 is in the FIG. 3 configuration. Flap 62 has a set of snap elements 72 on its outer surface, which faces tongue 76 in the sleeve's FIG. 3 configuration. Another set of snap elements 74 is on the inner, belt facing side of tongue 76, elements 74 engaging complimentary elements 72 when sleeve 64 is in the FIG. 3 configuration.

To install sleeve 42 onto the seat belt assembly, belt sections 34a and 34b are pulled away from pillar 12, and then inter-flap zone 51 on the inner side of sleeve 42 is placed against belt section 34a. While belt sections 34a and 34b are held together, inner flap 52 is folded over inter-flap zone 51 so that sections 34a and 34b are sandwiched snugly between flap 52 and zone 51. Outer flap 50 is then folded over flap 52 so that velcro panels 56 and 54 engage to fasten panels 50 and 52 together. Tongue 46 is passed through eye 36 along bight 48, threaded between outer flap 50 and pillar 12 and then pressed against outer flap 50, whereupon VELCRO ™ panel 60 engages VELCRO ™ panel 56 so as to affix tongue 46 to outer flap 50. Next, section 34a is pulled down and the sleeve is pulled down until tongue 46 is snugly held between outer flap 50 and pillar 12. At this point passenger 44 may be fastened into the seat belt assembly in conventional fashion. Any tendency of sleeve 42 to ride up is resisted by belt loop sections 78 and 80 (FIG. 3) that diverge upward from respective portions 34a and 34b toward bight 48.

It may be preferred that the combined thicknesses of inner flap 52, outer flap 50 and tongue 46 will be greater than the distance between section 34b and post 12 when belt segment 34 is tensioned in the absence of sleeve 42. Thus, when sleeve 42 is installed as seen in FIG. 3, normal operating tension on section 34b will squeeze inter-flap zone 51, inner flap 52 and outer flap 52 between itself and pillar 12. The squeezing action of section 34b will tend to hold sleeve 42 stationary relative to pillar 12 and inhibit disengagement of previously discussed fasteners such as VELCRO TM panels or snap elements. The inner surfaces of inter-gap zone 51 and inner flap 52 zone 51 and flap 52 may be provided with a high-friction coating or surface texture, as exemplified by a rubberized roughened surfaces shown in part at 82 and 84 on zone 51 and flap 52 respectively in FIG. 4. Surfaces 84 will help prevent relative movement between sleeve 42 and belt segment 34 after the sleeve is installed.

It may also be desired to outer flap 50 and inner flap 52 have at least moderate stiffness or resistance against out-of-plane bending. Optionally, inter-flap zone may be likewise stiffened. This stiffness requires these flaps to swing out away from sleeve 42 before the sleeves can be disengaged. However, post 12 will interfere with outward swing of the flaps when section 34b presses toward the post, whereby the flaps' stiffness inhibits their separation.

I wish it to be understood that I do not desire to be limited to the exact details of construction shown herein since obvious modifications will occur to those skilled in the relevant arts without departing from the spirit and scope of the following claims.

I claim:

1. A sleeve for a seat belt assembly mounted to a structural component wherein the assembly has an eye mounted on the structural component, a belt segment passing through the eye, the belt segment having a first portion and a second portion faced toward the second portion, the sleeve comprising:
   a zone of the sleeve faced against the first portion;
   an inner flap joined to and faced toward the zone, whereby the first and second portion are between the inner flap and the zone;
   an outer flap joined to the zone and faced toward the inner flap;
   attachment means between the inner flap and the outer flap for releasably affixing the flaps together,
   a tongue extending from the zone through the eye along the belt segment, a section of the tongue faced against the outer flap;
   fastener means between the section of the tongue and the outer flap for releasably affixing the tongue to the outer flap.

2. The sleeve of claim 1 wherein the first portion, the second portion, the inner flap, the outer flap and the section of the tongue are sandwiched snugly between the zone and the structural component.

3. The sleeve of claim 2 wherein the flaps have resistance to out-of-plane bending.

4. The sleeve of claim 2 wherein:
   the tongue defines a loop between the section of the tongue and the zone;
   the fastener means is a variable position fastener means wherein the section can be releasably affixed to the outer flap at a plurality of positions, whereby the size of the loop is variable.

5. The sleeve of claim 2 wherein the attachment means and the fastener means are comprised of VELCRO TM panels.

6. The sleeve of claim 2 wherein the attachment means and the fastener means are comprised of snap elements.

7. The sleeve of claim 2 further including:
   a first friction surface on the zone faced against the first portion of the belt segment;
   a second friction surface on the inner flap faced against the second portion of the belt segment.

8. The sleeve of claim 1 wherein the inner flap, the outer flap and the section of the tongue are squeezed between the second portion and the structural component when the belt segment is tensioned.

9. An improvement of a seat belt assembly mounted to a structural component wherein the assembly has an eye mounted to the structural component, a belt segment passing through the eye, the belt segment having a first portion and a second portion faced toward the second portion; the improvement being a sleeve, comprising:
   a zone of the sleeve faced against the first portion;
   a first flap connected to the zone and faced toward the zone, whereby the first portion and the second portion are between the first flap and the zone;
   a second flap of the sleeve connected to the zone and faced toward the first flap;
   attachment means for releasably affixing the flaps together;
   a tongue connected to the zone, the tongue passing through the eye along the belt segment, a section of the tongue faced against the second flap;
   fastener means for releasably affixing the tongue to the second flap.

10. The sleeve of claim 9 wherein the first portion, the second portion, the first flap, the second flap and the section of the tongue are compressed between the zone and the structural component.

11. The sleeve of claim 10 wherein:
    the tongue forms a loop between the section of the tongue and the zone;
    the fastener means is a variable position fastener means wherein the section can be releasably affixed to the second flap at a plurality of positions, whereby length of the loop is variable.

12. The sleeve of claim 9 wherein the first flap, the second flap and the section of the tongue are squeezed between the second portion and the structural component when the belt segment is tensioned.

13. The sleeve of claim 12 wherein the flaps have resistance to out-of-plane bending.

14. The sleeve of claim 12 further including:
    a first friction surface on the zone faced against the first portion of the belt segment;
    a second friction surface on the first flap faced against the first portion of the belt segment.

* * * * *